US007815066B2

(12) United States Patent
Desmeules

(10) Patent No.: US 7,815,066 B2
(45) Date of Patent: Oct. 19, 2010

(54) CABINET FOR GAS UTILITY METER

(76) Inventor: Michel Desmeules, 875, Constantin, Laval, Quebec (CA) H7P 4H2

( * ) Notice: Subject to any disclaimer, the term of this patent is extended or adjusted under 35 U.S.C. 154(b) by 694 days.

(21) Appl. No.: 11/767,517

(22) Filed: Jun. 24, 2007

(65) Prior Publication Data
US 2007/0295728 A1    Dec. 27, 2007

Related U.S. Application Data

(60) Provisional application No. 60/816,449, filed on Jun. 26, 2006.

(51) Int. Cl.
*B65D 6/28*    (2006.01)
(52) U.S. Cl. .................... 220/4.21; 220/480
(58) Field of Classification Search ................ 220/4.21, 220/480; 73/201
See application file for complete search history.

(56) References Cited

U.S. PATENT DOCUMENTS

| 2,690,077 | A | * | 9/1954 | Lisenbee ................. 73/201 |
|---|---|---|---|---|
| 3,893,584 | A | | 7/1975 | Ledford |
| 4,582,220 | A | | 4/1986 | Batting |
| 4,609,217 | A | | 9/1986 | Nielsen |
| 5,048,902 | A | * | 9/1991 | Daly ..................... 312/249.8 |
| D358,560 | S | | 5/1995 | George |
| 5,546,269 | A | * | 8/1996 | Robinson et al. ........... 361/660 |
| 5,844,134 | A | * | 12/1998 | Jiles ...................... 73/201 |
| 6,250,003 | B1 | * | 6/2001 | Phinney ................ 40/607.12 |
| 6,293,272 | B1 | * | 9/2001 | Harneit ................... 126/37 B |
| 6,968,969 | B1 | | 11/2005 | McKinnon |
| 2002/0150700 | A1 | | 10/2002 | Tennie |
| 2005/0077805 | A1 | * | 4/2005 | Dalebout et al. ....... 312/249.11 |

* cited by examiner

*Primary Examiner*—Stephen Castellano

(57) ABSTRACT

A cabinet for gas utility meter comprises a cover and a backing. The backing positioned behind a meter and the backing being fixedly attached to a wall. The backing has a bar bracket, a support bracket, and a meter riser bracket. A latching means to secure the cover over the backing. The backing and the cover have reinforced moulded ribs. A shut-off gas valve opening allows for access to a gas valve. There are also gas vent openings such as a bottom vent opening.

14 Claims, 6 Drawing Sheets

CABINET FOR GAS UTILITY METER

This application claims priority based on provisional application 60/816,449 filed Jun. 26, 2006

FIELD OF THE INVENTION

The present invention relates generally to cabinets and containers but more particularly to a cabinet designed for hiding and protecting a gas utility meter.

BACKGROUND OF THE INVENTION

Gas utility meters are usually ungainly and are also fragile with their exposed pipes which could be subject to an accidental impact from a variety of sources. Although there exists a variety of barriers such as heavy posts or various plates acting as guard rails, they do not hide the meter from view.

Most meter cabinets currently on the market do not have sufficient capacity. Meters developed for the asian or european market are not as sturdy, especially considering north american climate, and they do not fit the shape and size of north american meters, TC compensation or government approvals requirements. There is a need for an improved way of hiding and protecting a gas utility meter.

Prior Art Capability and Motivations, as Helping to show Patnetability Here

Even in hindsight consideration of the present invention to determine its inventive and novel nature, it is not only conceded but emphasized that the prior art had many details usable in this invention, but only if the prior art had the guidance of the present invention, details of both capability and motivation.

That is, it is emphasized that the prior art had/or knew several particulars which individually and accumulatively show the non-obviousness of this combination invention. E.g., a) The cost of the materials are relatively low and do not have a profound impact on price to the point of offsetting the benefits of this novel product;
b) The nature of an invention as being a "novel combination", in spite of existence of details separately, is especially significant here where the novelty is of the plurality of concepts, i.e., creating a cabinet for a gas utility meter that meets and exceeds all safety and norm regulations while being practical and easy to install;
c) The addition of providing useful features for the utility company on an ongoing basis such as easy meter reading;
d) The matter of particular cost-factors, in a detailed form which would surely convey the realization of the huge cost benefits involved in manufacturing such a device;
e) The cost-factors involved in the maintenance repair etc of gas utility meters requires that they be adequately protected from potential damages while not negating other aspects such as esthetics, safety, access to safety measures such as line cut off, ease of installation and ease of use for the gas meter reader;
f) The ease of tooling for the present invention has surely given manufacturers ample incentive to have made modifications for commercial competitiveness in a competitive industry, if the concepts had been obvious;
g) The prior art has always had sufficient skill to make many types of gas meter covers, more than ample skill to have achieved the present invention, but only if the concepts and their combinations had been conceived;
h) Substantially all of the operational characteristics and advantages of details of the present invention, when considered separately from one another and when considered separately from the present invention's details and accomplishment of the details, are within the skill of persons of various arts, but only when considered away from the integrated and novel combination of concepts which by their cooperative combination achieve this advantageous invention;
i) The details of the present invention, when considered solely from the standpoint of construction, are exceedingly simple, basically a two piece molded polymer assembly and the matter of simplicity of construction has long been recognized as indicative of inventive creativity;
j) Similarly, and a long-recognized indication of inventiveness of a novel combination, is the realistic principle that a person of ordinary skill in the art, as illustrated with respect to the claimed combination as differing in the stated respects from the prior art both as to construction and concept, is presumed to be one who thinks along the line of conventional wisdom in the art and is not one who undertakes to innovate; and
k) The predictable benefits from a novel gas meter that is easily installed on either new construction or established buildings having the features of this invention would seem sufficiently high that others would have been working on this type of product, but only if the concepts which it presents had been conceived.

Accordingly, although the prior art has had capability and motivation, amply sufficient to presumably give incentive to the development a cabinet for a gas utility meter according to the present invention, the fact remains that this invention awaited the creativity and inventive discovery of the present Inventor. In spite of ample motivation, the prior art did not suggest this invention.

Prior Art as Particular Instances of Failure to Provide This Novel Product and Installation Method In view of the general advantages of the present invention as an improved embodiment of the prior art, it may be difficult to realize that the prior art has not conceived of the combination purpose and achievement of the present invention, even though the need for it is a known requested commodity for people nowadays who (describe what people want). Surely the need for a cabinet for a gas utility meter that meets and exceeds all safety and norm regulations while being practical and easy to install has been known for decades and the technology to achieve such results has been known for years and that the various combination provided in this invention would have been desired and attempted long ago, but only if its factors and combination-nature had been obvious.

Other considerations, as herein mentioned, when realistically evaluated show the inventive nature of the present invention, a change in concept which the prior patent and other prior art did not achieve.

SUMMARY OF THE PRIOR ART'S LACK OF SUGGESTIONS OF THE CONCEPTS OF THE INVENTION'S COMBINATION

And the existence of such prior art knowledge and related ideas embodying such various features is not only conceded, it is emphasized; for as to the novelty here of the combination, of the invention as considered as a whole, a contrast to the prior art helps also to remind of needed improvement, and the advantages and the inventive significance of the present concepts. Thus, as shown herein as a contrast to all the prior art, the inventive significance of the present concepts as a combination is emphasized, and the nature of the concepts and their results can perhaps be easier seen as an invention.

Although varieties of prior art are conceded, and ample motivation is shown, and full capability in the prior art is conceded, no prior art shows or suggests details of the overall combination of the present invention, as is the proper and accepted way of considering the inventiveness nature of the concepts.

That is, although the prior art may show an approach to the overall invention, it is determinatively significant that none of the prior art shows the novel and advantageous concepts in combination, which provides the merits of this invention, even though certain details are shown separately from this accomplishment as a combination.

Many problems originally faced the realization of this invention and are shown here in a problem/solution table to show that the various steps in its realization did take various approaches in order to find the proper one which required several inventive insights and intuitive creative thinking in order to be thought out and implemented.

For example:

| Problem | Solution |
| --- | --- |
| No door access required | One piece moulding, pop off cover |
| Left or right regulator relief outlet determined at installation time only | Pre drill holes on side of backing. Flexible PVC hose with fittings replaces rigid vent |
| Regulator relief vent extension to meet venting code | Removing PVC relief elbow use coupling to join to pipe extension |
| No access to shut off valve | Hole drill in cabinet at valve height extension on valve knob |
| Must adapt to all exterior wall finishes | Redesign top haft backing with a 1.5" offset, redesign supports to compensate, reinforce backing with ribs as well as the sides. Inner covers had to be redesign seating to accommodate new baking shape |
| Regulator PVC vent approval | To comply with PVC vent approval present ¾" flex tube was replace with 1" PVC flex tube and fittings |
| Quick change out of regulator when connected to an vent extension | Standard 1" fitting on regulator vent was changed to a split fitting style allowing the vent pipe to remain in place while removing the regulator |
| Isolate tracer wire from meter set | Passage was made in backing, isolating it from meter set and accessible without removing cover |
| Remove cabinet side vents | Modify top of backing for vents |
| Relocate cover clamping latch for quick removal of cover | Modify each sides of backing and cover for lathes, addition of moulded handles to cover |
| Not all makes of regulators fit inside | Modify cover shape to allow for space |
| Improve aesthetics | Reshape covers from angular to rounded witch required some supports to be modified |
| Difficulty to redirect vent pipe in cold weather | Vent pipe changed to extra flex design pipe with lower temperature rating |
| Extension on valve rejected | Reshape lower left portion of covers to give access to valve with tools with out removing cover. Move piping and valve to the left to gain accessibility from out side. Relocate supports and redesign riser bracket. |
| First valve access rejected | Reshape lower left portion of covers to give access to valve with tools with out removing cover. Move piping and valve to the left to gain accessibility from out side. Relocate supports and redesign riser bracket for a second time. |
| Smaller design requested for non AMR installations | Redesign of front cover no impact on backing |
| Window is required for non AMR installation for readings | Both covers redesign to accept window option |
| Bug screen requested | Top and lower backing were modify for optional screens, as well as lower portions of covers accordingly |
| Must accept more than one size risers | Lower portions of both covers and backing where modified to accept riser pipe sizes of ½" to 1½" pipe; this implies use of a bushing. This does not affect shut of valve accessibility |
| Under meter support | Under meter support was made adjustable for all applications |

-continued

| Problem | Solution |
| --- | --- |
| Lower riser support does not align | Modify mold and move forward |
| Very minimal clearance between valve and riser support | Modify mould and lower riser support |
| New support location resulted in left corner to suspended and weak | Add and other anchor position this implies mould modification |
| Window on cover pops out under pressure | Modify cover mold window area add counter sink edge with lip support |

And the prior art's lack of an invention of a gas utility meter cabinet aimed at adequately protecting gas meters from potential damages while not negating other aspects such as aesthetics, safety, and other advantages of the present invention, which are goals only approached by the prior art, must be recognized as being a long-felt need now fulfilled.

Accordingly, the various concepts and components are conceded and emphasized to have been widely known in the prior art as to various installations; nevertheless, the prior art not having had the particular combination of concepts and details as here presented and shown in novel combination different from the prior art and its suggestions, even only a fair amount of realistic humility, to avoid consideration of this invention improperly by hindsight, requires the concepts and achievements here to be realistically viewed as a novel combination, inventive in nature. And especially is this a realistic consideration when viewed from the position of a person of ordinary skill in this art at the time of this invention, and without trying to reconstruct this invention from the prior art without use of hindsight toward particulars not suggested by the prior art.

FEATURES AND ADVANTAGES OF THE INVENTION

In view of the foregoing disadvantages inherent in the known devices now present in the prior art, the present invention, which will be described subsequently in greater detail, is to provide objects and advantages which are:

To provide for an aesthetically pleasing cover that hides a gas utility meter.

To provide for a cover that protects a gas utility meter against the environment both in terms of normal exposure than accidental damage.

To provide for a way to reduce installation time and maintenance costs by way of ease of installation and ease of removal for quick access such as for reading the meter or actuating the valve.

Other advantages include interior space allowing for installation of a secondary valve to feed a pool heater, auxiliary buildings or other accessories.

Further advantages include:
Fast lower cost of installation
Allows for standardization of installations
Extends metering station life cycle
Minimizes maintenance cost
Isolates tracer wire from meter set, prevents static discharge
Protects meter installations from elements
Protects against regulator freeze up
Protects from third party damage
Protects accidental personal injuries
Eliminates sealing problems vs. in wall mounted cabinets and eliminates work space restrictions To attain these ends, the present invention generally comprises a cover and a backing and the backing is positioned behind a meter and the backing is fixedly attached to a wall. The backing has a bar bracket, a support bracket, and a riser bracket.

There is a latching means to secure the cover onto the backing. The backing and the cover have reinforced ribs. A shut-off gas valve opening to allow for accessing a gas valve, and gas valve openings. The cover has a bottom venting opening and a riser opening to provide space for the passing of a main gas line riser into the cabinet.

Variations in the embodiment offer other features such as:

Notches are integrated into the bar bracket, the support bracket and the riser bracket so as to facilitate aligning and centring of the meter onto the bar bracket, the support bracket and the riser bracket.

The upper area of the backing is recessed so as to be detached from the wall to accommodate any type of wall finishing encountered.

A tracer wire opening is provided for passing a tracer wire so that it is visible for service line locates.

A viewing window provides for direct reading of he meter.

Handles are located on each side of the cover and are preferably, but not necessarily, made of cut out openings.

Gas vent assembly cover openings and gas vent assembly backing openings, located both on the left and on the right of the cabinet provide passage to a regulator vent tube.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter which contains illustrated preferred embodiments of the invention.

DETAILED DESCRIPTION

Figure 1:
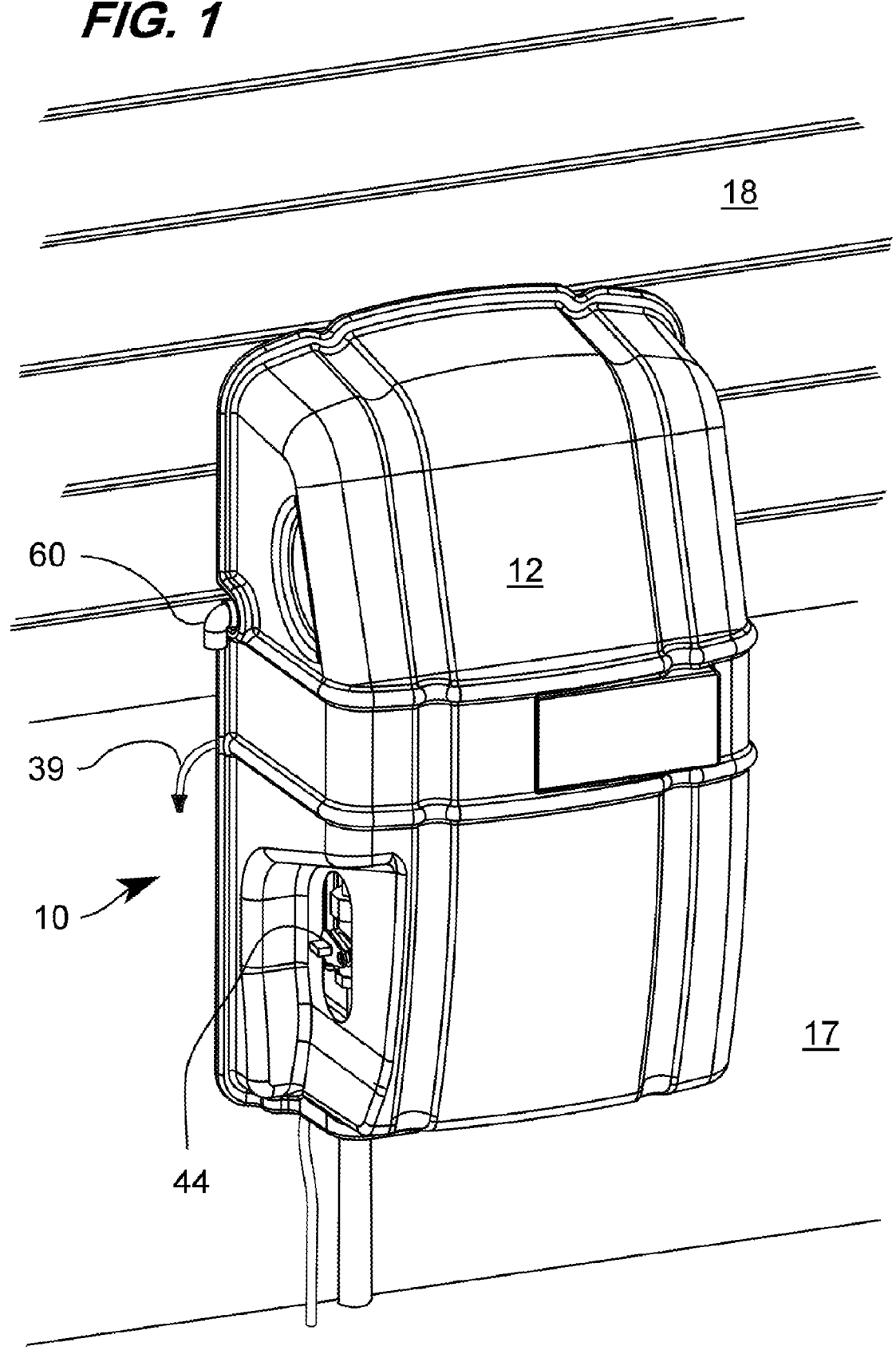
FIG. 1 perspective view of the invention in context of use.
Figure 2:
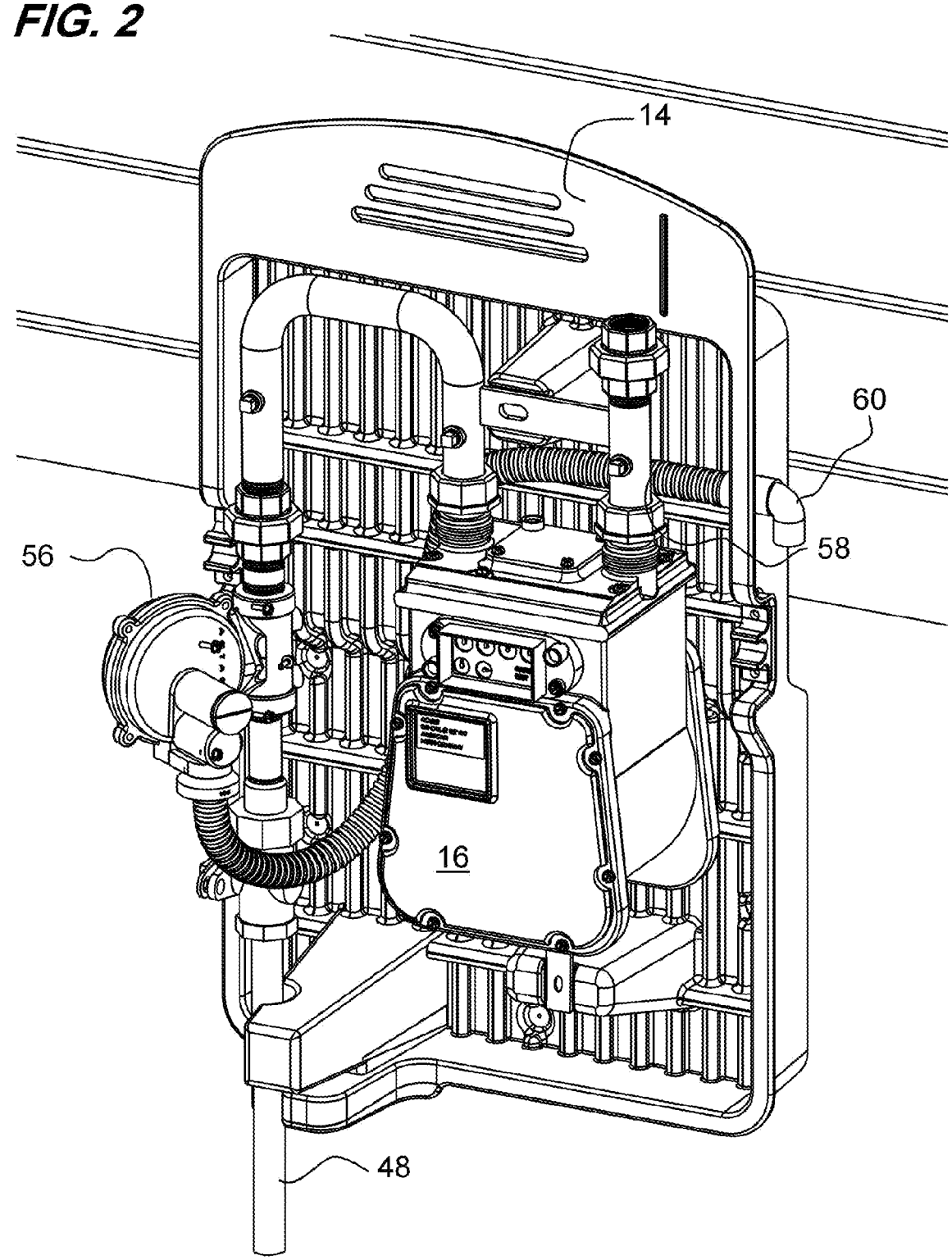
FIG. 2 Perspective view with the cover removed.
Figure 3:
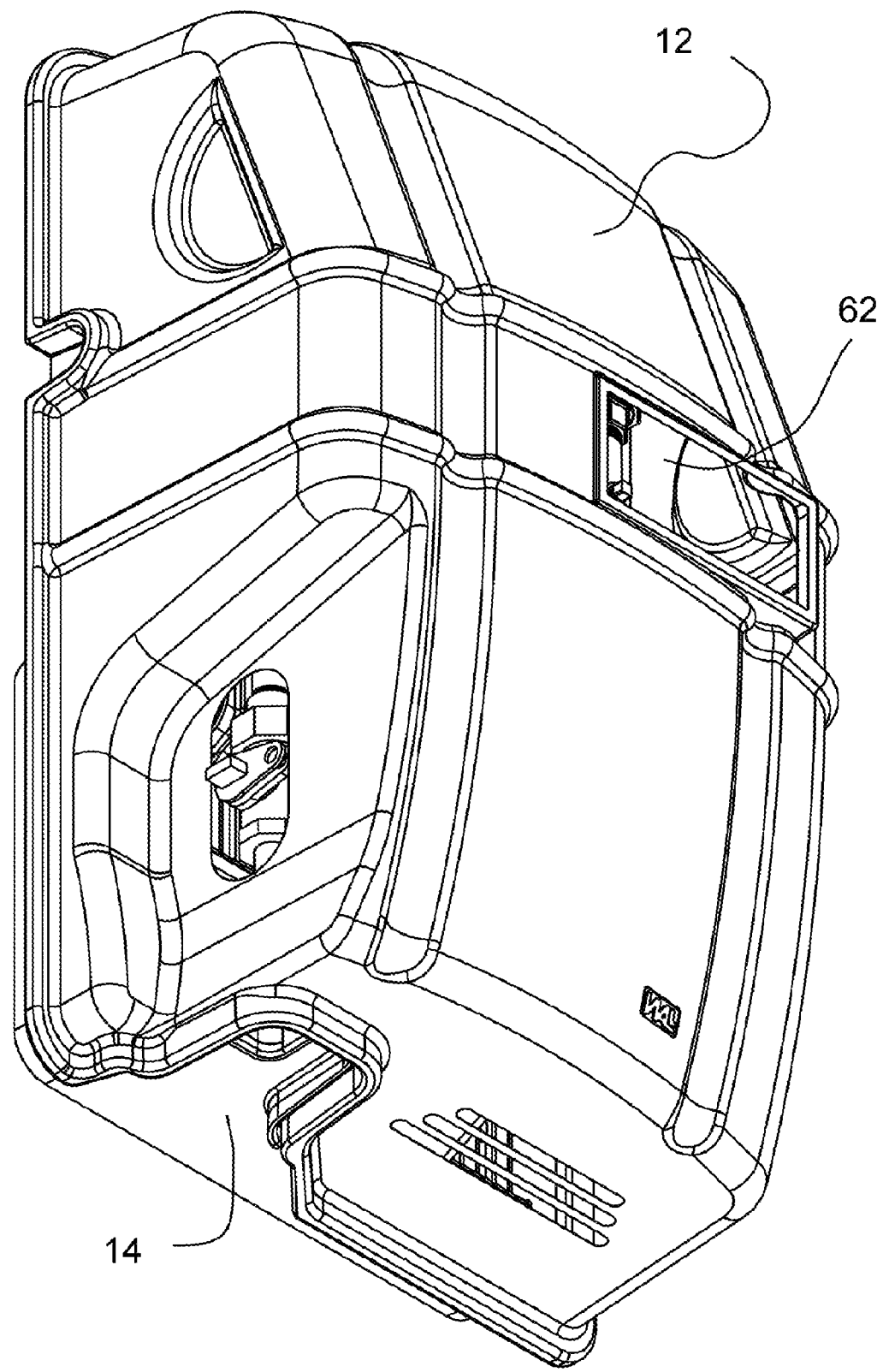
FIG. 3 Perspective view favoring the bottom.
Figure 4:
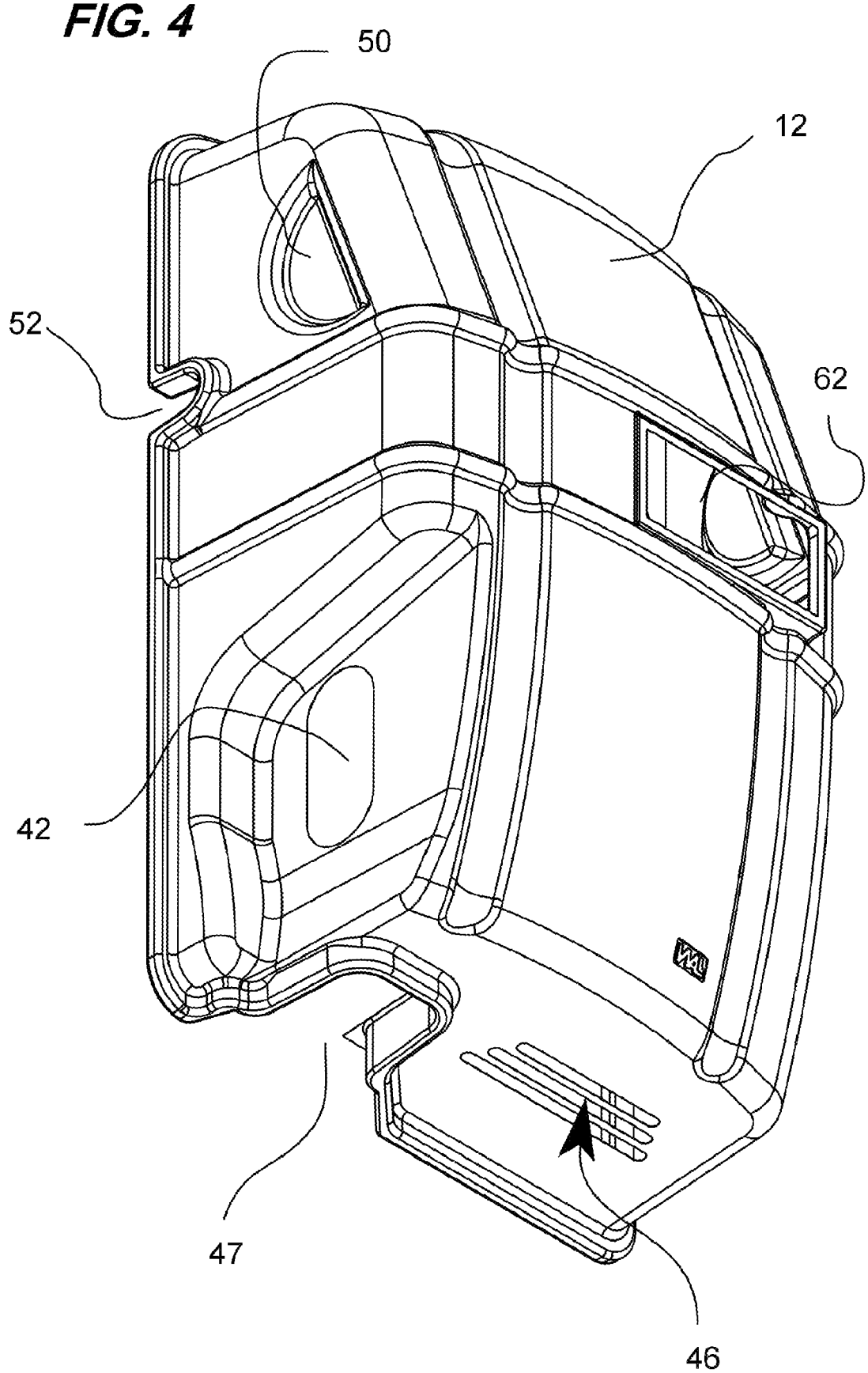
FIG. 4 Perspective view of the cover favoring one side.
Figure 5:
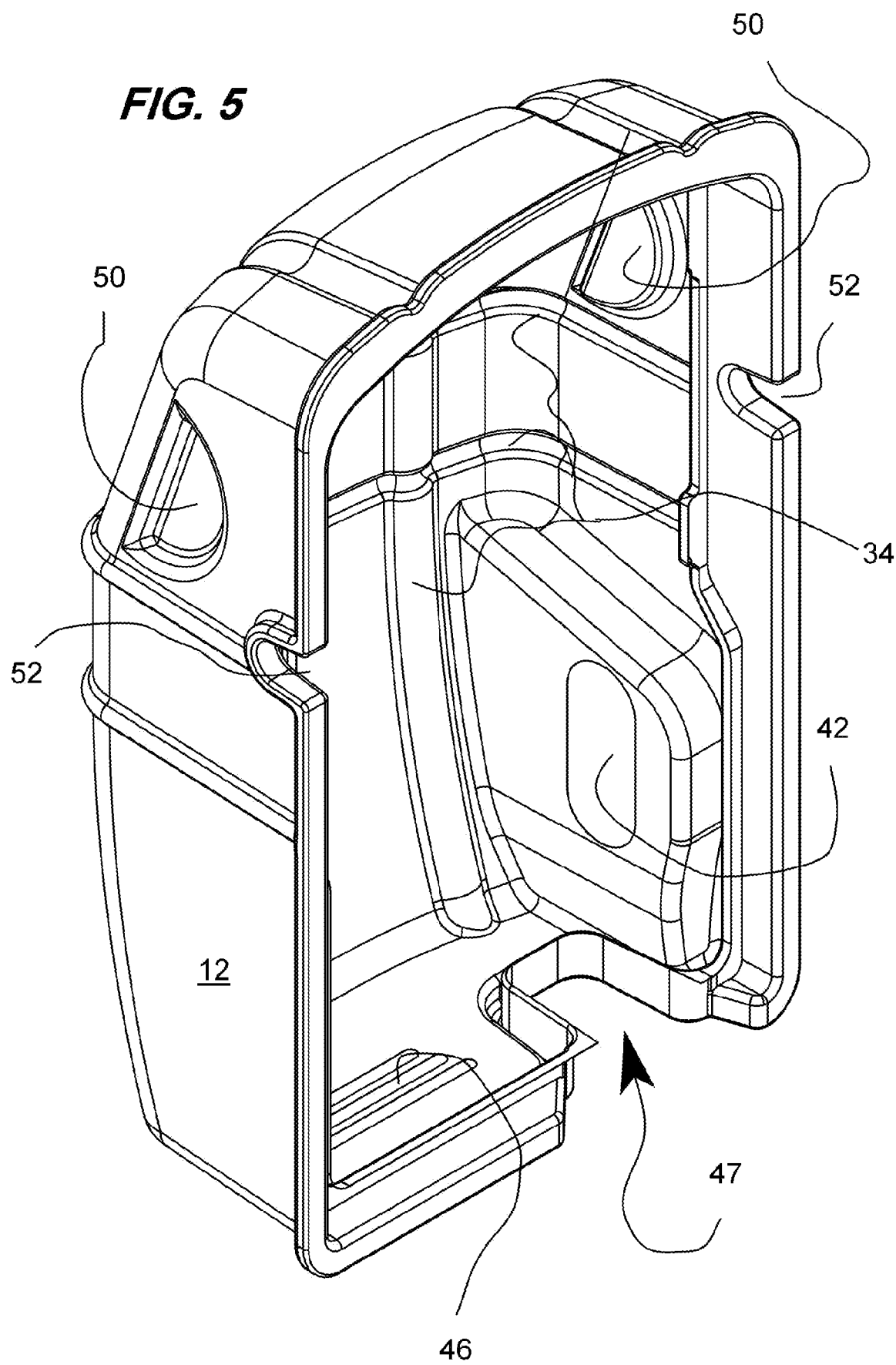
FIG. 5 Perspective view of the cover showing the inside.
Figure 6:
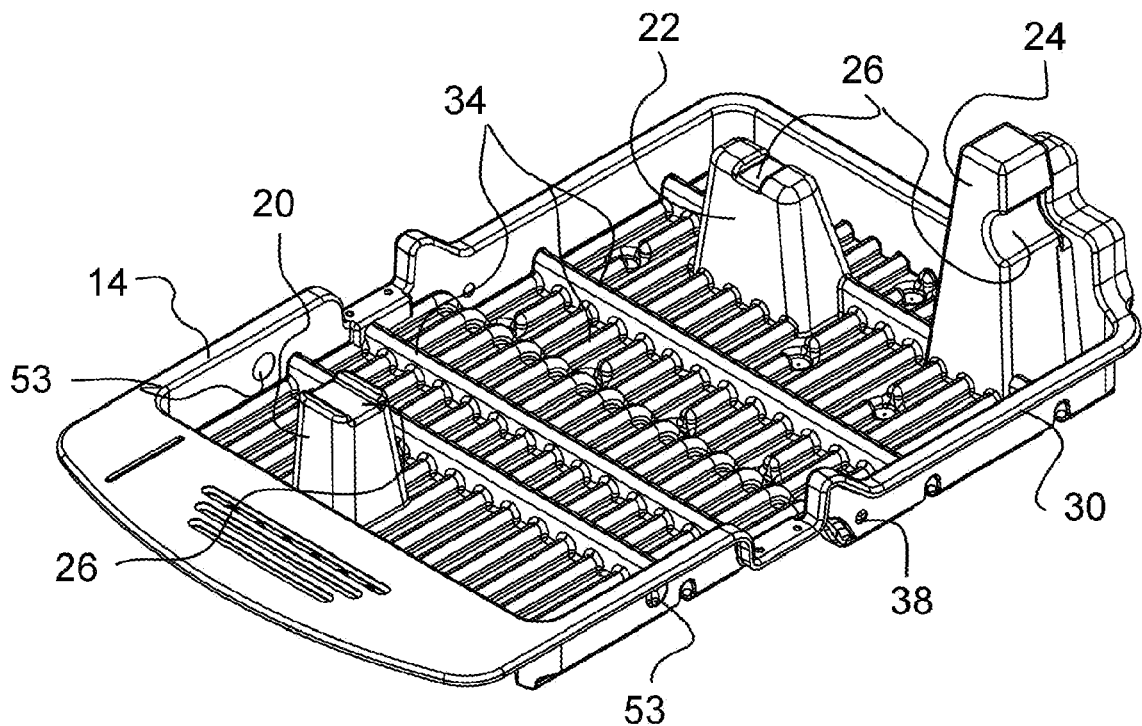
FIG. 6 Perspective view of the wall plate showing the interior.
Figure 7:
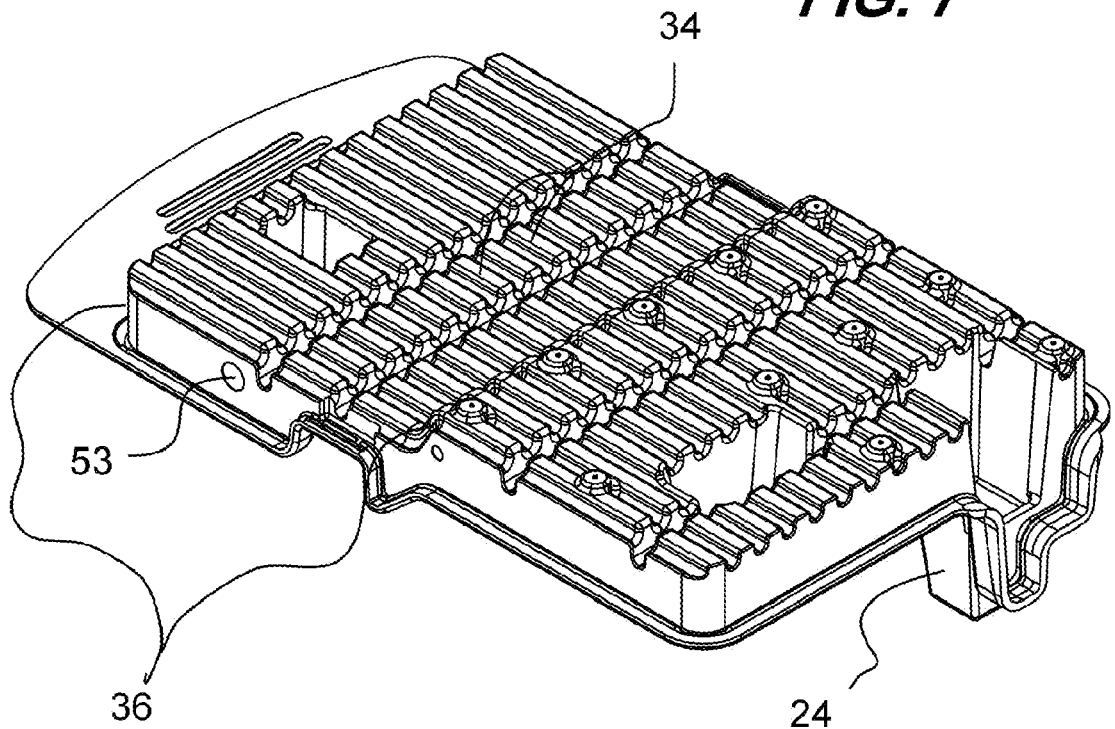
FIG. 7 Perspective view of the wall plate showing the exterior.

A cabinet for gas utility meter (10) has a cover (12) and a backing (14). The backing (14) is positioned behind a meter (16) and fixedly attached to a wall (18). Generally, this is done before the meter (16) is installed but can also be done afterwards such as the millions of already installed meters (16) across north america.

The backing (14) includes a bar bracket (20), a support bracket (22) and a riser bracket (24). Notches (26) are integrated into the bar bracket (20), the support bracket (22) and the riser bracket (24) so as to facilitate aligning and centring. It is also possible to insert threaded mechanical fasteners into them so as to secure the meter (16).

A latching means (30) secures the cover (12) over the backing (14) while allowing for quick and easy removal. The latching means (30) operates by resilient deformation of the cover which engages or disengages the latching means (30).

The upper area of the backing (14) is recessed so as to be detached from the wall (18) to accommodate any type of wall finishing encountered, i.e. aluminum, stone, brick,etc, which tend to protrude from the foundation (17). The backing (14) features a plurality of reinforced moulded ribs (34) to provide structural integrity. Horizontal parts (36) of the backing (12) are slanted so as to reduce potential accumulation of debris in these areas. A tracer wire opening (38) is provided for passing a tracer wire (39) so that it is visible for service line locates. A viewing window (62) provides for direct reading of he meter (16).

The cover (12) also has a plurality of reinforced moulded ribs (34) to provide structural integrity. A shut-off gas valve opening (42) allows for easy access to a gas valve (44). The cover (12) has a bottom venting opening (46) as well as a riser opening (47) to provide space for the passing of a main gas line riser (48) into the cabinet (10). The cabinet (10) is generally well vented so as not to allow any potential gas buildup or heat buildup. Handles (50) are located on each side of the cover (12) and are preferably, but not necessarily, made of cut out openings.

Gas vent assembly cover openings (52) and gas vent assembly backing openings (53), located both on the left and on the right of the cabinet (10) provide passage to a regulator vent tube (58), generally made out of flexible PVC, pre-assembled with a connector (60) such as a twist-on MNPT connector for example.

The cabinet (10) can be pre-assembled as per customer specs. i.e. meter set assembly, gas vent assembly, etc. . . . The cabinet (10) comes with all necessary hardware. If needed, cuts can be made on the cover to accommodate the existing piping configuration.

As to current technology, the cabinet (10) is preferably manufactured of a polymer impact resistant for temperatures of −30 Celsius, as standard, with optional manufacturing for −40 Celsius. It is UV protected. Fire retardant is optional. The customers name and logo can be molded on the cover as requested. The cover (10) has been designed to accommodate Automatic Meter Reading devices. Also, the cover has a built-in window (62) to allow for direct meter reading.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is;

1. A cabinet for use with a gas utility meter comprising:
   a cover and a backing;
   said backing adapted to be positioned behind said gas utility meter and adapted to be fixedly attached to a wall member, said backing including a bar bracket located in a center top portion thereof, a support bracket located in a center lower portion thereof and in longitudinal alignment with said bar bracket, a riser bracket located in a lower corner portion thereof, moulded ribs, and a latch portion adapted to removably secure said cover onto said backing;
   said cover including a shut off valve opening on one side thereof adapted to allow access to a gas valve, a gas vent opening on each side thereof adapted to allow gas to pass therethrough, bottom vent openings on a bottom side thereof adapted to allow gas to pass therethrough, and a riser opening on a bottom side thereof located in a lower corner portion thereof, in proximity to said bottom vent openings, and adapted to receive said riser bracket of said bracket therein while allowing a main gas line also to pass therethrough.

2. A cabinet for use with a gas utility meter as claimed in claim 1, wherein notches are integrated into said bar bracket, said support bracket, and said riser bracket, and are adapted to facilitate alignment and centering of said gas utility meter onto said bar bracket, said support bracket, and said riser bracket.

3. A cabinet for use with a gas utility meter as claimed in claim 1, wherein the upper area of said backing is recessed and adapted to be detachable from said wall to accommodate any type of wall finishing.

4. A cabinet for use with a gas utility meter as claimed in claim 1, wherein said backing further includes a tracer wire opening adapted to allow passage of a tracer wire so that it is visible for service line locates.

5. A cabinet for use with a gas utility meter as claimed in claim 1, wherein said cover further includes a viewing window on a front portion thereof adapted to allow direct reading of a meter.

6. A cabinet for use with a gas utility meter as claimed in claim 1, wherein said cover further includes a handle on each side thereof, which can be formed from cut out openings in said sides thereof.

7. A cabinet for use with a gas utility meter as claimed in claim 1, wherein said cover further includes gas vent openings on each side thereof;
and wherein said backing further includes gas vent openings on each side thereof corresponding to said gas vent openings on the sides of the cover;
wherein said gas vent openings of said cover and backing are adapted to allow passage to a regulator vent tube.

8. A combination of a gas utility meter assembly and a cabinet adapted to house said gas utility meter assembly therein comprising:
a gas utility meter assembly including a gas utility meter, a main gas line, a gas valve controlling the flow of gas through said main gas line, and a regulator vent tube;
and a cabinet adapted to house said gas utility meter assembly, and comprising a cover and a backing;
said backing positioned behind said gas utility meter and adapted to be fixedly attached to a wall member; said backing including a bar bracket located in a center top portion thereof, a support bracket located in a center lower portion thereof and in longitudinal alignment with said bar bracket, a riser bracket located in a lower corner portion thereof, moulded ribs, and a latch portion adapted to removably secure said cover onto said backing;
said cover including a shut off valve opening on one side thereof adapted to allow access to said gas valve, a gas vent opening on each side thereof adapted to allow gas to pass therethrough, bottom vent openings on a bottom side thereof adapted to allow gas to pass therethrough, and a riser opening on a bottom side thereof located in a lower corner portion thereof, in proximity to said bottom vent openings, and adapted to receive said riser bracket of said bracket therein while allowing said main gas line also to pass therethrough.

9. A cabinet for use with a gas utility meter as claimed in claim 8, wherein notches are integrated into said bar bracket, said support bracket, and said riser bracket, and are adapted to facilitate alignment and centering of said gas utility meter onto said bar bracket, said support bracket, and said riser bracket.

10. A cabinet for use with a gas utility meter as claimed in claim 8, wherein the upper area of said backing is recessed and adapted to be detachable from said wall to accommodate any type of wall finishing.

11. A cabinet for use with a gas utility meter as claimed in claim 8, wherein said backing further includes a tracer wire opening adapted to allow passage of a tracer wire so that it is visible for service line locates.

12. A cabinet for use with a gas utility meter as claimed in claim 8, wherein said cover further includes a viewing window on a front portion thereof adapted to allow direct reading of a meter.

13. A cabinet for use with a gas utility meter as claimed in claim 8, wherein said cover further includes a handle on each side thereof, which can be formed from cut out openings in said sides thereof.

14. A cabinet for use with a gas utility meter as claimed in claim 8, wherein said cover further includes gas vent openings on each side thereof;
and wherein said backing further includes gas vent openings on each side thereof corresponding to said gas vent openings on the sides of the cover;
wherein said gas vent openings of said cover and backing are adapted to allow passage to a regulator vent tube.

* * * * *